Figures 1, 2:
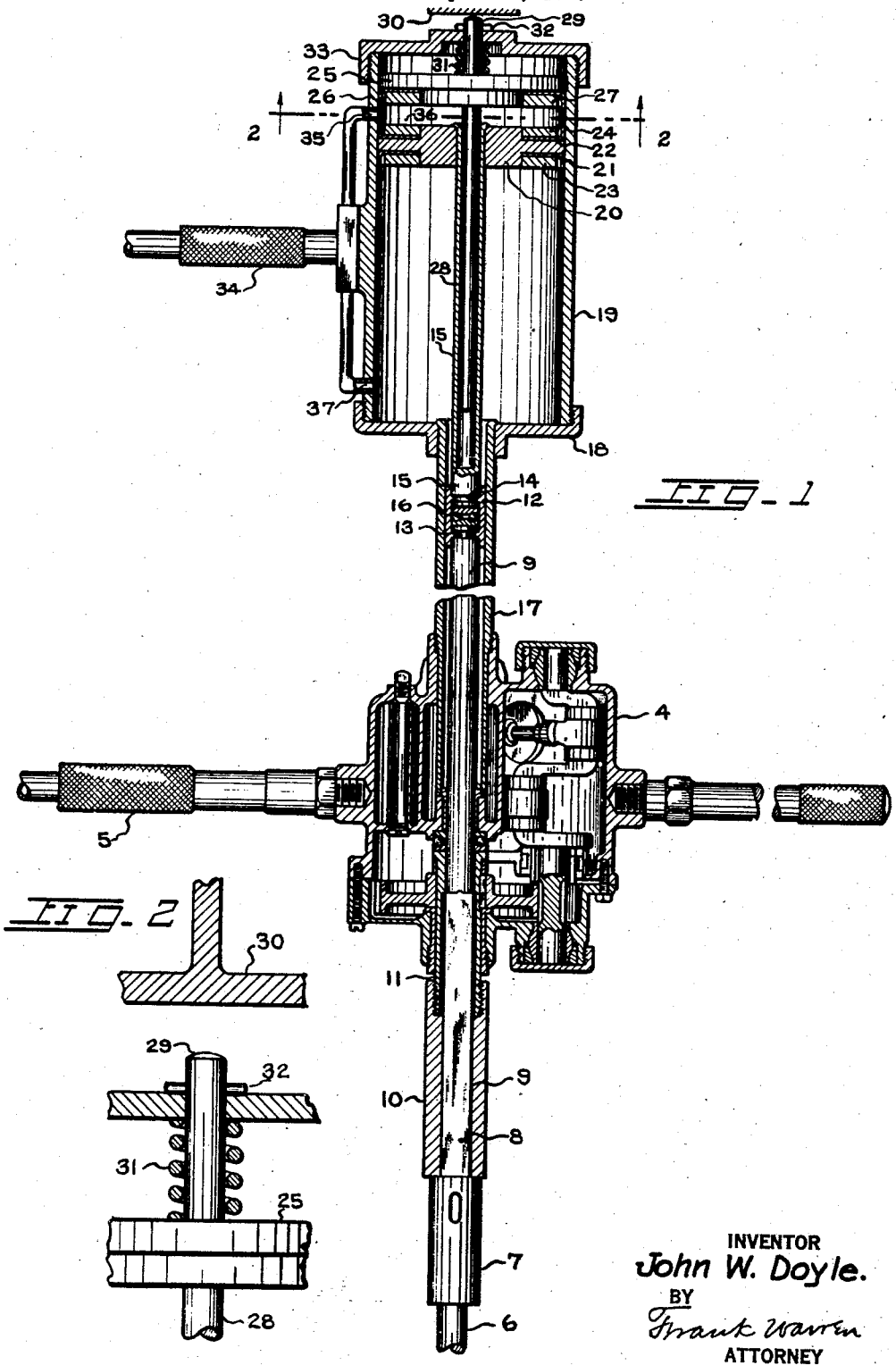

June 26, 1928.

J. W. DOYLE 1,675,168

POWER DRIVEN DRILL

Filed April 19, 1926

INVENTOR
John W. Doyle.
BY
Frank Warren
ATTORNEY

Patented June 26, 1928.

1,675,168

UNITED STATES PATENT OFFICE.

JOHN W. DOYLE, OF SEATTLE, WASHINGTON.

POWER-DRIVEN DRILL.

Application filed April 19, 1926. Serial No. 102,907.

My invention relates to improvements in power driven drills and the object of my invention is to provide a fluid operated feeding mechanism for applying a pressure upon a power driven drill whereby the thrust may be applied directly to the drill from the fluid pressure means acting against a member supported exteriorly and independent of said feeding mechanism and said drill driving means.

Another object is to provide a power driven drill in which the driven shaft is provided with rotary motion from the driving means of said drill and the feeding of the drill is controlled by fluid operated means independent of said driving means.

Another object is to provide a fluid operated drill of well known form with a driven spindle that is slidably mounted therein in such a manner that such spindle may be moved backward and forward while said driven spindle is being rotated.

Another object is to provide means for automatically feeding the drill of a power driven drill into the work at a speed consistent with the cutting ability of said drill.

I accomplish these objects by devices illustrated in the accompanying drawings, wherein—

Figure 1 is a sectional view of my invention as applied to a standard make of air drill; and Fig. 2 is an enlarged sectional view taken on line 2, 2 of Fig. 1 showing a supporting member exteriorly and independent of the feeding mechanism.

In the operation of an ordinary power driven drill when the drill is fed into the work by a mechanical feeding mechanism such feeding is not regulated by the cutting edges of the drill and it is often forced into the metal regardless of the fact that its condition does not warrant its removing the amount of material required by the movement of the mechanical mechanism. My invention eliminates the possibility of damaging the drill, by forcing it through the metal at a faster rate than the cutting edges will cut, and at the same time permits the drill to remove all the metal the cutting edges of the drill will stand.

Referring to the drawings, throughout which like reference numerals indicate like parts, the numeral 4 designates a standard make of air drill embodying all the features required to impart rotary motion to a drill. 5 designates a throttle valve for controlling the operation of said air drill 4. A drill 6 that is held in a drill chuck 7 is caused to rotate by reason of the square portion 8 of the spindle 9 fitting into the driving sleeve 10 which is secured to the main driving member 11 of the air drill 4 as shown in Fig. 1.

A coupling sleeve 12 is arranged to engage with an annular groove 13 disposed in the upper end of the spindle 9 which sleeve 12 also engages with an annular groove 14 on the tubular piston rod 15. A ball thrust bearing 16 is disposed between the end of the spindle 9 and the end of the piston rod 15 and is held in position by the coupling sleeve 12.

A tubular member 17 serves to guide the sleeve 12 and is rigidly connected to a cylinder head 18 thereby forming the main support for the cylinder 19. A piston 20 is disposed within the cylinder 19 and is securely mounted on the tubular piston rod 15 and is provided with cup leathers 21 and 22 which are held in position by rings 23 and 24 to prevent any leakage of fluid past the piston. Another piston 25 is disposed within said cylinder 19 opposite the piston 20, and is arranged with a cup leather 26 which is positioned and held in place by a ring 27. A guide rod 28 is disposed on the lower side of the piston 25 and extends downwardly into the tubular portion of the connecting rod 15 thereby forming a suitable guide for the said piston 25. On the upper side of said piston 25 is positioned a pressure pin 29 arranged to transmit the reacting pressures to a stop member 30 which is rigidly supported externally of the cylinder 19 in a manner not shown.

A spring 31 is disposed around the pressure pin 29 and acts against the piston 25 and cylinder head 33 thereby urging said pin away from the stop member 30 and a small pin 32 acts in a manner to prevent said spring from causing the complete withdrawal of the pin 29 from the cylinder head 33.

A valve 34 controls the flow of fluid under pressure through port 35 into the space 36 between the pistons 20 and 25. Said valve 34 also controls the flow of fluid under pressure through a port 37 into the space formed below piston 20 in the cylinder 19.

A stop is effected for the upward movement of the spindle 9 by reason of the drill chuck 7 striking against the sleeve 10.

The operation of my invention is as follows:

Compressed air, from a source of supply not shown, is admitted to the motor of the air drill 4 through the throttle valve 5 thereby imparting a rotary motion to the drill 6, held in the chuck 7, by reason of the main driving sleeve 10 which sleeve rotating the spindle 9 of which the chuck 7 in an integral part, by means of the square portion 8 fitting into a square hole in said sleeve 10. The square portion 8 permits the application of rotary motion to said spindle 9 while it is being moved in or out of the driving sleeve 10.

To apply pressure upon the drill 6 the valve 34 is turned to a position allowing compressed air, from a source not shown, to flow through the port 35 into the space 36 between the pistons 20 and 25 that are disposed in the cylinder 19 thus causing the piston 20 to move downwardly in the cylinder 19 thereby imparting pressure to the tubular piston rod 15, the ball race 16, the spindle 9, the drill chuck 7 and finally the drill 6. The piston 25 is caused to move upwardly in the cylinder 19 at the same time that the piston 20 is moved downwardly and the pressure pin 29 comes into contact with the stop member 30 which is supported independently of the fluid operated feeding mechanism and the driving mechanism of the drill. This arrangement of the piston 25 and the pressure pin 29 permits the reaction of the force applied to the drill 6 to be received by a member or support positioned apart and independent from the driving mechanism of the drill thereby making my invention suitable for work requiring more than the ordinary accuracy since no strains of any kind due to forcing of the drill into the work are placed on the driving mechanism or upon the inoperative parts of the fluid operated feeding mechanism. On the lower side of the piston 25 is disposed a guide rod 28 that extends downwardly into the tubular piston rod 15 and serves to form a suitable guide for said piston 25 preventing any tendency of the piston 25 to bind or become wedged in the cylinder 19 when pressure is applied between the two pistons. When the fluid pressure is removed from between the pistons 20 and 25 the spring 31 draws the pressure pin 29 away from the stop member 30 by acting against the cylinder head 33 and the piston 25.

When it is desired to withdraw the drill 6 from the work the valve 34 may be turned to allow compressed air to pass through port 37 into the space formed in the cylinder below the piston 20 thereby causing the fluid pressure to act upon the lower side of said piston whereupon the air is exhausted from the space 36 between the pistons 20 and 25 by the exhaust means disclosed in my United States Letters Patent No. 1,316,145 issued September 16, 1919. The force exerted below the piston 20 moves said piston upward and by means of the coupling sleeve 12 engaging with the annular grooves 13 and 14 of the spindle 7 and tubular piston rod 15 respectively the spindle 9 is caused to move upward with the said piston 20 thereby causing a similar movement of the drill 6.

The ball thrust 16 permits the free rotation of the spindle 9 while pressure is being applied upon the drill and at the same time prevents the tubular piston rod 15 from turning due to the rotary motion of the spindle 9.

From the foregoing explanation it can be easily seen that the control of the drill is simply a matter of operating valves 5 and 34 to attain any desired results within the range of the device.

From the foregoing description and accompanying drawings the advantage of the construction and method of operation makes it obvious that modifications will occur to those skilled in the art to which my invention appertains and such changes may be made without departing from the spirit of my invention.

What I claim is:

In a power driven drill, a drill chuck, a driven spindle therefor having a portion adapted to slidably engage a driving member, means for driving said driving member, a thrust bearing in operative engagement with said driving spindle, a cylinder secured in fixed, spaced, axial relation to said spindle, a drill advancing piston, a piston rod secured to said piston, a coupling rotatively connecting said piston rod and said spindle, means for introducing fluid under pressure to either side of said piston, another piston in said cylinder having means arranged to transmit pressure to a stop member positioned exteriorly of said cylinder.

In witness whereof, I hereunto subscribe my name this 14th day of April, A. D. 1926.

JOHN W. DOYLE.